(12) United States Patent
Freear et al.

(10) Patent No.: US 10,976,285 B2
(45) Date of Patent: Apr. 13, 2021

(54) PIPELINE MAPPING SYSTEM

(71) Applicant: Speir Hunter Ltd, Nottingham (GB)

(72) Inventors: Steven Freear, Leeds (GB); Chau Ky Vo, Nottingham (GB); Ben Varcoe, Leeds (GB); David Matthew Joseph Cowell, Leeds (GB); Stephen George Henry Staples, Leeds (GB); Christopher Lee Cookson, Leeds (GB)

(73) Assignee: Speir Hunter Ltd, Nottingham (GB)

( * ) Notice: Subject to any disclaimer, the term of this patent is extended or adjusted under 35 U.S.C. 154(b) by 24 days.

(21) Appl. No.: 16/332,118

(22) PCT Filed: Sep. 8, 2017

(86) PCT No.: PCT/GB2017/052638
§ 371 (c)(1),
(2) Date: Mar. 11, 2019

(87) PCT Pub. No.: WO2018/046947
PCT Pub. Date: Mar. 15, 2018

(65) Prior Publication Data
US 2019/0212299 A1 Jul. 11, 2019

(30) Foreign Application Priority Data

Sep. 9, 2016 (GB) ..................................... 1615331

(51) Int. Cl.
*G01N 27/82* (2006.01)
*G01V 3/15* (2006.01)
(52) U.S. Cl.
CPC ............... *G01N 27/82* (2013.01); *G01V 3/15* (2013.01)
(58) Field of Classification Search
CPC .................................. G01N 27/82; G01V 3/15
(Continued)

(56) References Cited

U.S. PATENT DOCUMENTS

| 3,597,678 A | * | 8/1971 | Fearon | ............... G01N 27/9046 |
| | | | | 324/220 |
| 4,390,836 A | * | 6/1983 | Bruce | .................... G01R 31/58 |
| | | | | 324/557 |

(Continued)

FOREIGN PATENT DOCUMENTS

| EP | 0 770 887 A2 | 5/1997 |
| RU | 88 453 U1 | 11/2009 |

(Continued)

OTHER PUBLICATIONS

Stephen Billings, et al., "Interpretation of high-resolution low-altitude helicopter magnetometer surveys over sites contaminated with unexploded ordnance", Journal of Applied Geophysics, vol. 72, 2010, pp. 225-231 (8 pgs.).

(Continued)

*Primary Examiner* — Clayton E. LaBelle
*Assistant Examiner* — Kevin C Butler
(74) *Attorney, Agent, or Firm* — Maier & Maier, PLLC

(57) ABSTRACT

An apparatus and methods for determining the position of an elongate structure. A number of magnetic field sensors arranged at fixed spacing, each sensor being arranged to sense a magnetic field of a remote structure induced by the Earth's magnetic field in at least two orthogonal directions. In use, the magnetic field sensors are arranged remotely of an elongate structure having a longitudinal axis, such that the magnetic field sensors are spaced in a lateral direction relative to said longitudinal axis. An angular spacing for the magnetic field sensors about the longitudinal axis is determined according to the magnetic field readings in the two orthogonal directions and a distance between one or more of said magnetic field sensors and said elongate structure is determined based on said angular spacing determination.

18 Claims, 5 Drawing Sheets

(58) Field of Classification Search
USPC .......................................................... 324/240
See application file for complete search history.

(56) References Cited

U.S. PATENT DOCUMENTS

| | | | | |
|---|---|---|---|---|
| 4,542,344 | A * | 9/1985 | Darilek | G01V 3/06 324/326 |
| 4,727,329 | A * | 2/1988 | Behr | G01V 3/08 324/345 |
| 5,155,442 | A * | 10/1992 | Mercer | G01C 9/20 324/690 |
| 5,321,361 | A * | 6/1994 | Goodman | G01V 3/165 324/253 |
| 5,581,037 | A * | 12/1996 | Kwun | G01N 29/14 73/623 |
| 5,920,194 | A * | 7/1999 | Lewis | G01V 3/06 324/326 |
| 6,586,937 | B2 * | 7/2003 | Goodman | G01V 3/15 324/326 |
| 6,888,353 | B1 * | 5/2005 | Wiegert | G01V 3/15 324/244 |
| 7,038,454 | B2 * | 5/2006 | Gard | E21B 47/092 324/326 |
| 7,164,270 | B1 * | 1/2007 | Chen | G01V 3/104 324/326 |
| 7,336,078 | B1 * | 2/2008 | Merewether | G01V 3/15 324/326 |
| 7,688,072 | B1 * | 3/2010 | Wiegert | G01V 3/15 324/225 |
| 8,542,127 | B1 * | 9/2013 | Goroshevskiy | G01N 27/82 324/309 |
| 8,960,012 | B2 * | 2/2015 | Dunford | G01M 5/0025 324/209 |
| 2003/0011363 | A1 * | 1/2003 | Wayman | G01N 27/82 324/238 |
| 2006/0232259 | A1 * | 10/2006 | Olsson | G01V 3/15 324/67 |
| 2007/0024278 | A1 * | 2/2007 | Walters | G01N 27/902 324/242 |
| 2007/0040647 | A1 * | 2/2007 | Saenz | H04W 4/026 340/3.1 |
| 2007/0126421 | A1 * | 6/2007 | Barnes | G01M 3/18 324/238 |
| 2007/0126422 | A1 * | 6/2007 | Crouch | G01N 27/904 324/240 |
| 2008/0042645 | A1 * | 2/2008 | Kaack | G01N 27/87 324/220 |
| 2011/0054729 | A1 * | 3/2011 | Whitehead | G01S 19/35 701/31.4 |
| 2011/0156957 | A1 * | 6/2011 | Waite | G01V 3/081 342/450 |
| 2014/0002071 | A1 * | 1/2014 | Martin | G01N 27/82 324/240 |
| 2015/0042323 | A1 * | 2/2015 | Freear | G01N 27/82 324/240 |
| 2016/0231278 | A1 * | 8/2016 | Goroshevskiy | G01L 1/12 |
| 2016/0245780 | A1 * | 8/2016 | Wayman | G01N 27/82 |
| 2016/0252481 | A1 * | 9/2016 | Zheng | G01N 27/82 324/238 |
| 2018/0196005 | A1 * | 7/2018 | Fanini | G01N 27/82 |
| 2018/0202975 | A1 * | 7/2018 | Tada | G01B 7/26 |
| 2018/0259486 | A1 * | 9/2018 | Babcock, IV | G06T 19/006 |
| 2019/0004203 | A1 * | 1/2019 | Olsson | G01V 3/165 |
| 2019/0212299 | A1 * | 7/2019 | Freear | G01V 3/15 |

FOREIGN PATENT DOCUMENTS

| | | |
|---|---|---|
| WO | 2010/017318 A2 | 2/2010 |
| WO | 2013/128210 A1 | 9/2013 |
| WO | 2013/128212 A1 | 9/2013 |

OTHER PUBLICATIONS

M. B. Rogers, et al., "Ground-Based Magnetic Surveys as a New Technique to Locate Subsurface Drainage Pipes: A Case Study", Applied Engineering in Agriculture, vol. 21, No. 3, 2005, pp. 421-426 (6 pgs.).
Notification Concerning Transmittal of International Preliminary Report on Patentability dated Mar. 21, 2019, in connection with corresponding international Application No. PCT/GB2017/052638 (8 pgs.).
Kexi Liao et al., "Principle and technical characteristics of non-contact magnetic tomography method inspection for oil and gas pipeline", International Conference on Pipelines and Trenchless Technology, Oct. 26, 2011, p. 1039-1048; 10 pages.
Search Report under Section 17(5) dated Feb. 15, 2017 of corresponding United Kingdom application No. 1615331.4; 3 pages.
International Search Report dated Dec. 8, 2017 in corresponding International application No. PCT/GB2017/052638; 5 pages.
Written Opinion of the International Searching Authority dated Dec. 8, 2017 in corresponding International application No. PCT/GB2017/052638; 6 pages.

* cited by examiner

PIPELINE MAPPING SYSTEM

TITLE

FIELD

The present invention relates to methods and systems for determining the position/location of structures that are not readily visible for inspection. The invention finds particular application to buried structures, e.g. elongate structures, such as pipes or pipelines.

BACKGROUND

Structural problems with existing pipelines are of significant concern to a pipeline operator. An aging pipeline infrastructure means that such problems are generally becoming more prevalent over time. The cost of excavating and replacing or repairing existing pipeline is considerable, not only due to the cost of the engineering works but also due to the potential need to shut down a pipeline whilst works are carried out.

This problem has been documented in the past and there have been proposed methods to allow pipelines to be inspected such that faults can be detected and maintenance or overhaul work to be scheduled in a manner which minimises the impact for the pipeline operator.

However there exists a problem that the precise location of pipelines beneath the ground may not be accurately recorded. This may be due to inaccurate or incomplete information at the time of pipeline installation, or else due to later ground movement with the pipeline in situ. There exists a real risk for many pipelines that undertaking excavation at an estimated, rather than precise, pipeline location could risk missing the pipeline altogether or else damaging the pipeline during excavation to an inaccurate depth.

WO 2013/128212 and WO 2013/128210 (both in the name of Speir Hunter Limited) disclose the use of a magnetometer array to determine stress concentrations in buried structures and thereby determine potential faults in the structure. However any magnetic field disturbance dissipate in three dimensions with distance from the source, i.e. over the surface of a sphere having a radius equal to the distance from the anomaly. A correction factor can be applied to the disturbances recorded in the magnetic field at a distance from the anomaly in order to more closely identify the anomaly. The accuracy of a known or estimated depth of the pipeline has been found to contribute assessment of the anomaly. It has been found by the inventors that the proximity of the depth determination to the anomaly can be a significant factor in remote pipeline surveying f this type.

It is known in the art that the depth of buried pipelines can be determined at individual locations using a conventional pipe locator. The principle is to apply a signal to the buried pipeline using a transmitter and measure the induced signal of the pipeline using a hand held receiver. This method gives a single depth measurement. Mapping measurement locations is possible using such pipe locators but it will be slow for a long survey. The use of the geomagnetic field or ground penetrating radar (GPR) to calculate the position of buried structures has been previously proposed.

Further disclosures of technology for detecting buried objects include:
Darilek, Glenn T., and Edward H. Cooper Jr. "Detecting buried pipeline depth and location with electromagnetic triangulation." U.S. Pat. No. 4,542,344. 17 Sep. 1985.
Goodman, William L. "Magnetic signature detector for detection of magnetic buried targets." U.S. Pat. No. 6,586,937. 1 Jul. 2003.
Lewis, Andrew B., John R. Cottle, and Graham R. Cooper. "Device for locating objects that emit electromagnetic signals." U.S. Pat. No. 5,920,194. 6 Jul. 1999.
Gard, Michael F., and Jian Jin. "System and method for detecting an underground object using magnetic field sensing." U.S. Pat. No. 7,038,454. 2 May 2006

It is disclosed that the passive magnetic field of a pipeline induced from power-frequency sources can be utilised to locate a pipe in P. Fedde and C. Patterson, "Locator continuously records pipeline depth readings," Oil Gas J.; (United States), vol. 86, no. 35, 1988.

It is an aim of the present invention to provide a method and system for determining the position of remote structures, such as pipelines, which is better suited to survey use.

SUMMARY

According to a first aspect of the invention there is provided a method of determining the position of an elongate structure comprising: providing a plurality of magnetic field sensors arranged at fixed spacing, each sensor being arranged to sense a magnetic field of a remote structure induced by the Earth's magnetic field in at least two orthogonal directions; arranging the magnetic field sensors remotely of an elongate structure having a longitudinal axis, such that the magnetic field sensors are spaced in a lateral direction relative to said longitudinal axis; determining an angular spacing of each magnetic field sensor about the longitudinal axis according to the magnetic field readings in the two orthogonal directions; and determining a distance between one or more of said magnetic field sensors and said elongate structure based on said angular spacing determination.

The fixed spacing of the magnetic field sensors may be used in conjunction with the angular orientation determination in order to determine the relative spacing, distance or depth between the one or more sensor and the elongate structure. A trigonometric determination of may be used.

The invention is beneficial in that it proposes a technique that can be used to determine the depth and location of buried structures through the remote magnetic field of the structure induced by the Earth's magnetic field. The sensors may thus sense the Earth's magnetic field as disturbed locally by the presence of the elongate structure. Such a technique is useful as it allows generation of a 3D map of the buried structure, in which both the location and the buried depth can be calculated at the same time from an above-ground magnetic survey. The invention is well suited to elongate metallic structures, such as pipelines.

The invention is particularly well suited to use with the survey systems and methods disclosed in WO 2013/128212 and WO 2013/128210 (Speir Hunter Limited), since location determination can be applied at the same time as determining the structural integrity, e.g. stress concentrations, within the surveyed structure. The location/depth determination by the present invention may contribute to the accuracy of the structural integrity assessment. Additionally or alternatively the present invention may provide up-to-date and accurate depth/location information for the surveyed structure, e.g. to be presented as a report alongside the structural integrity assessment.

The subject matter of WO 2013/128212 and WO 2013/128210 is hereby incorporated by reference.

The invention may reside in a 3D mapping system or method for remote structures. The invention may apply to buried and/or submerged structures. The invention may comprise a depth-of-cover determining method or system.

Unlike many prior art systems, the present invention may not require emission/reflection of signals by the equipment for the purpose of determining the relative distance to the remote structure. Instead, the invention is derived from the understanding that the Earth's magnetic field causes suitably conducting/metallic bodies to behave in the manner of a weak magnet, thereby inducing a resulting magnetic field, which can be measured.

The determined distance between the one or more magnetic field sensor and said elongate structure may be perpendicular to the lateral spacing of the magnetic field sensors, e.g. comprising a vertical/perpendicular spacing or depth measurement.

The distance determined between the one or more magnetic field sensor and said elongate structure may comprise a distance to/from the longitudinal axis and/or a surface of the structure. The method may comprise first determining the distance/spacing between the one or more sensor and one of the longitudinal axis and the surface of the structure, and subsequently determining the distance/spacing for the other of the longitudinal axis and the surface of the structure.

The method may comprise determining a lateral spacing of each magnetic field sensor from the longitudinal axis.

The angular spacing may or may not comprise an angular spacing from vertical, or another reference orientation, about the longitudinal axis. The angular spacing may be determined according to the ratio of magnetic field readings, e.g. the magnitude thereof, in the two orthogonal directions.

The method may comprise moving the plurality of sensors in a direction of the elongate member or said longitudinal axis. The method may comprise taking a plurality of readings at locations along the length of the elongate member or longitudinal axis. The method may comprise repeating any or any combination of the determination steps for said plurality of locations. The method may output multiple distance/depth values for the elongate structure along its length.

The method may comprise taking a plurality of readings at locations along the length of the elongate structure and searching for features in the magnetic field readings. The method may comprise processing the plurality of magnetic field reading values so as to identify a feature within said values. The feature may comprise a peak, trough, zero-crossing, asymptote, or other similar feature or discontinuity in the magnetic field readings, for example between one location and one or more further location.

The method may comprise identifying one or more location as a structural attribute of the structure and/or discounting one or more location from the determination of distance and/or angular spacing. The identifying and/or discounting may be performed according to a feature or feature type in the magnetic field readings and/or a location along the length of the elongate structure relative to one or more further feature.

The method may comprise identifying one or more feature, or feature type, in the magnetic field readings occurring at a predetermined or regular/repeating spacing along the length of the elongate structure. The one or more feature, or feature type, when so identified, may be discounted from determination of distance, depth or angular spacing.

The method may comprise identifying one or more feature, or feature type, in the magnetic field readings as being indicative of a region of mechanical stress/strain or a fault in the structure. Said feature may or may not comprise a change in gradient in the magnetic field at or beyond one or more threshold value. Said one or more feature may be discounted from distance or angular spacing determination.

The method may or may not comprise maintaining the sensors at a substantially fixed orientation. Each orthogonal direction of one magnetic field sensor may be aligned/parallel with each corresponding orthogonal direction of the/each other magnetic field sensor.

The orthogonal directions of the sensors may each be substantially perpendicular to the longitudinal axis of the structure. The orthogonal directions of the sensors may comprise horizontal and vertical directions when oriented for use.

The method may comprise maintaining the sensors at a substantially constant distance above the ground.

The method may comprise maintaining a spacing of the sensors on either side of the longitudinal axis, e.g. for a plurality of sensor readings which may be spaced in the direction of the longitudinal axis.

The method may comprise determining the position of one or more of the magnetic field sensors and determining the relative position of the remote elongate structure. A three-dimensional position of the elongate structure may be output. The output may comprise a depth/height component. The output may additionally comprise a latitude and/or a longitude component.

According to a second aspect of the invention, there is provided apparatus for remote determination of the position of an elongate structure, the apparatus comprising: a sensor array comprising two or more magnetic field sensors arranged to be moved relative to the structure in known direction each sensor being arranged to sense a magnetic field of a remote structure induced by the Earth's magnetic field in at least two orthogonal directions; a support for holding the magnetic field sensors at a spacing in a lateral direction relative to a longitudinal axis of the elongate structure; a controller for recording magnetic field readings taken by the magnetic field sensors in said two orthogonal directions at different locations in the direction of movement thereof; one or more processor for processing the plurality of magnetic field readings so as to determine an angular spacing of each magnetic field sensor about the longitudinal axis according to the magnetic field readings, and determine a distance between one or more of said magnetic field sensors and said elongate structure based on said angular spacing determination.

The sensors may be held in a fixed arrangement. In one example, the sensors may be arranged in a linear alignment or as a linear array. Two sensors may be used. The sensors may comprise a first sensor aligned between two further sensors on either side thereof, wherein the spacing between the first sensor and each further sensor may be equal.

The sensors may be arranged in a two-dimensional or three-dimensional array. That is to say, at least one sensor may be offset from a line or axis connecting two or more sensors of the array. The sensors may comprise first and second sensors arranged along a first axis and one or more further sensors, which may be offset from the first axis. A third sensor may be arranged along the first axis. The one or more further or offset sensors may be aligned in a second axis with respect to one of the first, second or third sensors. The second axis may be perpendicular to the first axis. The first axis and second axis may be arranged to be oriented in a substantially vertical plane in use.

The support structure may comprise one or more arms for supporting the sensors.

The apparatus may comprise a control unit for logging magnetic field readings generated by the sensors. The system may comprise an instrument for pipeline assessment, surveying or monitoring.

The apparatus may comprise a positioning system for the apparatus. A Global Navigation Satellite System (GNSS) such as a Global Positioning System (GPS) may be used.

According to a further aspect of the invention, there is provided a data carrier for use with the first or second aspect and comprising machine readable instructions for the control of one or more processors to receive the sensor readings and determine the angular spacing of each magnetic field sensor about the longitudinal axis according to the magnetic field readings, and determine the distance between one or more of said magnetic field sensors and said elongate structure based on said angular spacing determination.

The elongate structure typically comprises a metallic/magnetic material, e.g. a ferromagnetic material. The elongate structure may comprise a pipe, pipeline, or a section thereof.

Wherever practicable, any of the essential or preferable features defined in relation to any one aspect of the invention may be applied to any further aspect. Accordingly, the invention may comprise various alternative configurations of the features defined above.

BRIEF DESCRIPTION OF THE DRAWINGS

Practicable embodiments of the invention are described in further detail below by way of example only with reference to the accompanying drawings, of which.

DETAILED DESCRIPTION

Figure 1:
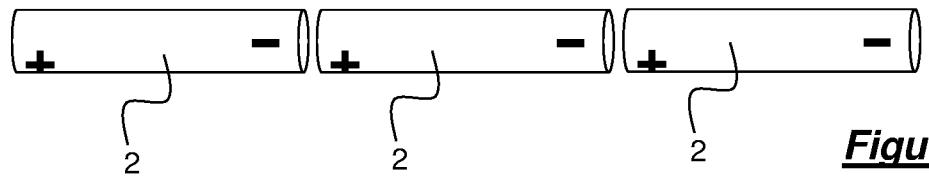
FIG. 1 shows a schematic side view of a simplified pipe structure to be assessed.

The present invention derives from an understanding that a large elongate structure, such as a pipe section, can be modelled as being represented by a bar magnet 2 as shown in FIG. 1. This is due to the Earth's magnetic field inducing magnetic poles at either end of the structure. Whilst such a phenomenon is relatively weak in smaller objects the specific size and shape of pipeline sections result in a relatively stronger magnetic effect that has been determined to be useful in determining any or any combination of depth, lateral spacing and/or orientation of the pipeline when suitable magnetic field sensing equipment is moved relative thereto.

Based on this understanding, a pipeline as a whole can be understood to represent a series of bar magnets 2 in an end-to-end arrangement as shown in FIG. 1. It has also been found that joints/welds and/or other intermediate features between pipeline sections, that would otherwise jeopardise such a model, can be used to the benefit of a pipeline survey.

Figure 2:
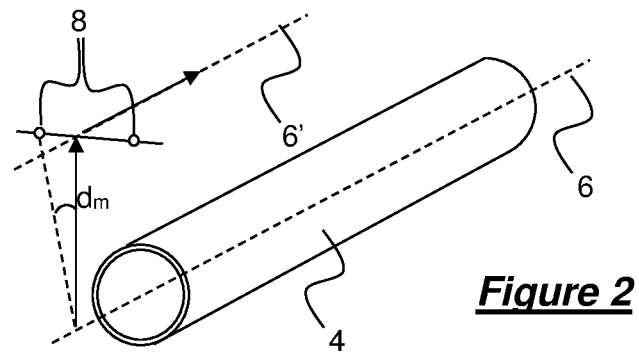
FIG. 2 shows a three dimensional view of a pipeline under inspection in accordance with an example of the invention.

Turning to FIG. 2, there is shown a pipe section 4 having a longitudinal axis 6. Examples of the invention to be described below are based on the arrangement of at least two magnetic field sensors 8 that are laterally spaced relative to the longitudinal axis 6 and at a distance $d_m$ there-from such that the direction to each sensor from the axis 6 is angularly offset from vertical by an angle, $\alpha$.

A static magnetic field reading may be taken by each sensor 8 in order to determine a value for $d_m$ in the manner to be described below. The sensors 8 may be moved in the general direction of the pipeline axis 6, e.g. roughly in the direction of a parallel axis 6', in order to generate magnetic field data and corresponding depth readings along the length of the pipe 4.

Unlike prior art devices, the invention resides in measuring the induced magnetic field caused by the presence of the pipe 4 within the Earth's magnetic field. Accordingly the present method and system do not require active emission/reflection of signals for the purpose of determining pipeline depth.

Figure 3:
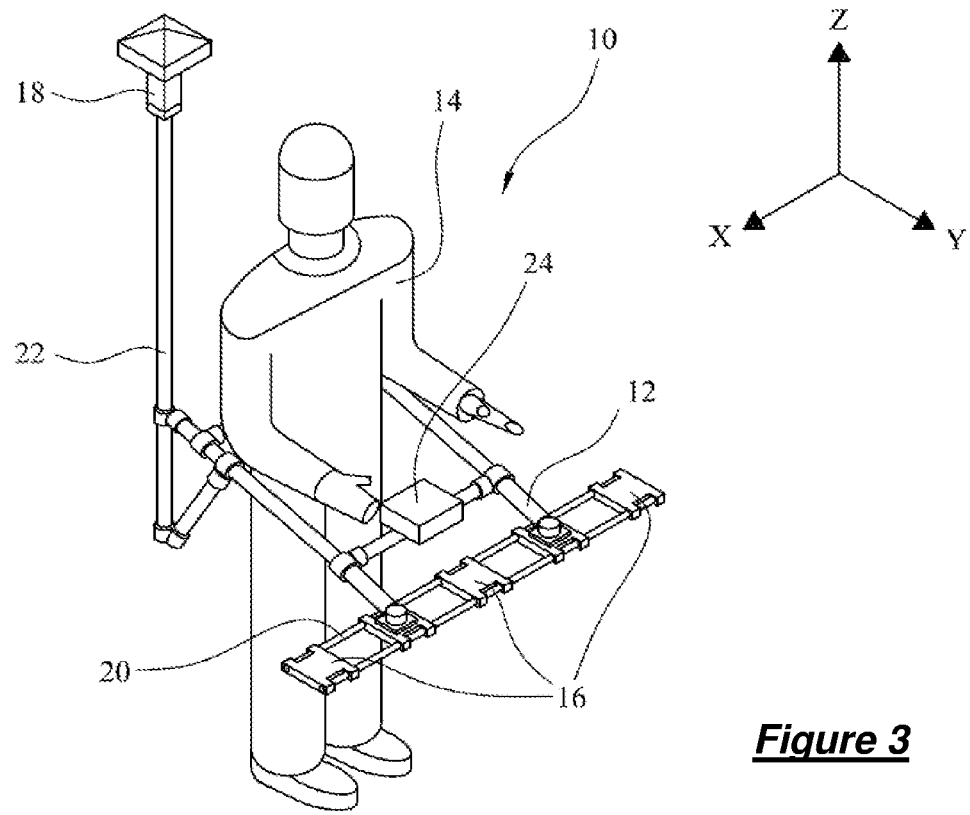
FIG. 3 shows an example of a depth determination system in accordance with an example of the invention.

Details of examples of the sensing equipment are described below with reference to FIGS. 3 to 5. Turning firstly to FIG. 3 a portable implementation of the equipment 10 in which the relevant instruments are mounted to a frame 12 such that the assembly can be carried by an individual 14. The instruments/sensors comprise, in brief, a plurality of magnetic field sensors 16 assembled in a predetermined array, as will be described in further detail below, and a position determining system 18.

The sensors in this embodiment comprise directional or vector magnetometers, such as fluxgate magnetometers, which each measure the magnetic field in the X, Y and Z directions. In this example, the sensors create an analogue voltage output that is proportional to the magnetic field component in each direction. The particular magnetometers selected in this embodiment comprise Three-Axis Fluxgate Magnetic Field Sensors. These magnetometers have been found to have beneficial low noise and low power characteristics, although it may be possible to use other vector magnetometers.

The term "sensor" as used herein may include the use of a plurality or sensors, which may for example be co-located in the form of a sensor device.

The sensors 16 are mounted on one or more rigid spacer arm 20, which may be referred to herein as a sensor arm, such that the relative positions and spacing of the sensors are known and remain fixed during use of the equipment. In this regard, the sensors are mounted onto support blocks which in turn mount onto the sensor arm 20. The sensors in the present embodiment are located in front of the operator. These are located in the left, centre and right hand mounting blocks along the sensor arm 20.

The position determining system comprises a receiver arranged to receive electromagnetic signals, typically from a plurality of satellites, such that an associated processor can determine the location of the receiver based on the location of the signal transmitters and the time taken for the received signals to reach the receiver. A further support 22 arm is used to maintain the position determining system 18 above the sensors 16 when oriented for use as shown in FIG. 3.

An axis system can be established as shown in FIG. 3, wherein the direction of travel in use is substantially in the Y direction. The apparatus is oriented in use such that the Y direction is substantially parallel with the longitudinal axis of a pipeline being assessed. In this context, the arm 20 and array of sensors 16 extend in a direction (i.e. in the X direction) which is lateral/perpendicular to the direction of travel and/or the longitudinal axis of the pipeline. The sensors 16 in this configuration lie in a substantially horizontal plane. The position determining receiver 18 is maintained in a known spaced relationship with respect to the sensors 16 above the sensors, in the Z direction. This spacing is important since it is used in determining the precise location of the sensors 16.

It is also important that the receiver 18, which comprises electronic equipment is suitably displaced relative to the sensors so as to avoid interference with the magnetic field caused by the pipeline which will typically be below the sensors 16 in use.

Any or any combination of the arm 20, frame 12 and/or further arm 22 comprise a support structure that is preferably formed of materials which are transparent with respect to the magnetic field as far as possible. Carbon fibre, nylon and/or other plastic materials can be used to this end, and the support structure is formed of carbon fibre tubes, coupled together using plastic joints.

Whilst the support structure is configured to allow it to be carried or worn by an operator on foot, it is possible that the support structure could also be arranged for mounting on a vehicle such as a trailer or cart or similar wheeled structure. In other examples, it is possible that the support structure could be carried on an airborne vehicle. An aircraft such as a drone or the like could be used for this purpose if necessary. The carrying of the apparatus on foot is in many ways preferred due to the varying terrain which is often experienced when following the path of a pipeline above ground. Furthermore, the operator will typically steady him/herself when carrying the apparatus such that the sensors will be maintained substantially in the desired horizontal orientation when taking magnetic field readings.

To further guarantee a predictable orientation of the sensors 16, it is possible to provide the support arm 20 and/or structure with one or more orientation indicators, such as a spirit level, such that the operator can confirm or adjust the orientation accordingly. Additionally or alternatively it is possible to provide the support structure with a levelling mechanism, allowing the support arm to pivot with respect to the remainder of the support structure and thereby maintain a desired, substantially horizontal orientation.

Whilst the above support structure embodiments may help to retain the sensors in a predictable orientation, the inventors have determined that the accuracy of the readings can be improved by providing an orientation sensor, such as an inclinometer, to determine the angular orientation of the array with respect to the horizontal and/or vertical axis.

Figure 4:
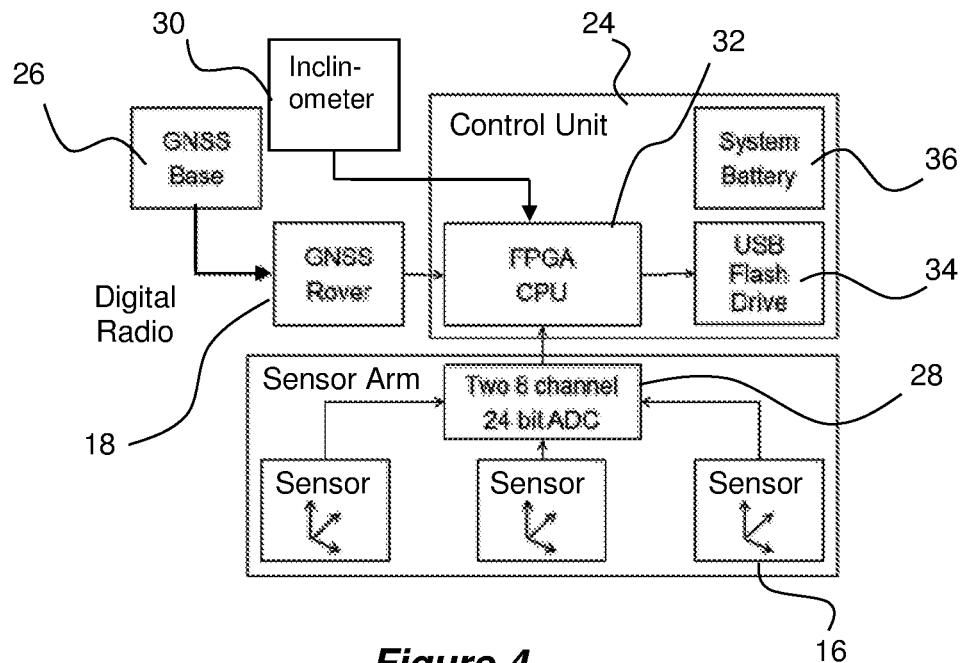
FIG. 4 shows a schematic of basic electronics components used in a system according to an example of the invention.

FIG. 4 shows the key components that comprise the electronic system of the apparatus, in order to allow collection of the required data by a control unit 24. The sensors 16 comprise vector magnetometers, each capable of measuring the magnetic field in three dimensions.

The position-determining system comprises the aforementioned receiver 18, which is portable with the apparatus and comprises a high resolution global navigation satellite system (GNSS). Such a system utilises signals from multiple satellite positioning constellations to provide increased accuracy over using a single satellite constellation.

A static base unit 26 is also provided which also comprises a GNSS receiver module. The static base unit functions in the manner of a conventional satellite positioning unit in that it receives a plurality of satellite signals which are used to determine its location. However the fixed nature of the base unit 26 allows a highly accurate position determination for use as a reference point. The base unit 26 calculates and transmits satellite correction data to the mobile receiver 18 such that it can correct its position determination with reference to the base unit 26 in the manner of a so-called Real Time Kinematic (RTK) system. The base unit monitors errors in the received satellite signals and transmits real time corrections to the mobile unit 18, typically over a UHF radio link. Position determination can be carried out with a relative accuracy between the two receivers of below 1 cm and typically approximately 15 mm.

The system comprises an analogue-to-digital converter (ADC) 28 for digitising the analogue output signal of the magnetometers 16. In this embodiment, nine channels are required to digitise the output of the three magnetometers in each direction. Each ADC is capable of digitising eight signals and thus two ADC chips are used to digitise the outputs from the magnetometers. The ADCs are preferably selected to offer high resolution and low noise. 24-bit ADCs are used in this embodiment.

Analogue filtering is performed on the magnetometers output before digitisation to remove undesired frequencies, such as, for example, 50 or 60 Hz interference from power lines and/or general electronic noise such as that present due to digital electronics and radio waves. Additional or alternative filtering steps may be used to eliminate background or environmental effects on the magnetic field. Such filtering may allow the invention to be used in a variety of different environments (e.g. at different altitudes, on land, in enclosed spaces and/or underwater).

An inclinometer 30 may be provided in this embodiment to provide real-time indication of the angular orientation of the magnetometer array relative to one or more of the X, Y and/or Z axes. In this embodiment a reading of angular inclination relative to each of those axes is taken. A microelectromechanical system (MEMS) based inclinometer may be used for this purpose and preferably a precision, triaxial device.

The inclinometer is typically mounted on the sensor arm 20 such that its relative orientation with respect to the magnetic field sensors is fixed.

A control unit 24 is provided on the support structure as shown in FIG. 2, typically on a cross bar or other support formation in front of the user.

The control unit 24 receives and manages the incoming data signals from the magnetometers (via the ADC) as well as the GNSS receiver 18 and, optionally, also the inclinometer output. The control unit 24 comprises one or more processor 32. In this embodiment a Field Programmable Gate Array (FPGA) is used, which provides a flexible, reprogrammable device that is provided with custom digital logic for the purpose of the present invention. Alternatively, the processor 32 could be realised using a dedicated microprocessor integrated circuit.

In the current configuration the FPGA contains two microprocessors and custom real-time digital interface to the ADC chips 28. The first control unit processor is an autonomous processor that receives and interprets data from the satellite positioning system 18. This processor directly interfaces to the main processor so that the satellite positioning parameters are updated in real-time (i.e. without delay, or else wherein any delay is sufficiently small that it would not significantly affect the accuracy of any readings taken for a given location).

The main processor 32 controls or coordinates the entire operation of the instrument 10, with the primary function being to record magnetometer and satellite positioning data to a memory device, typically in real-time. This is achieved by co-ordinating concurrent readings for the magnetic field (typically in all directions) with position data and time stamping a memory entry or record of all those readings. The memory entry may also comprise the current inclinometer reading. Such co-ordinated, time-stamped data capture from all sensors facilitates effective processing of the data at a later time. Since a significant volume of data can be gathered for any single survey, it will be appreciated that the reliability of the data for later processing is of particular importance.

In addition to the main processor 32, the control unit comprises a non-volatile data store 34, which may take the form of a USB Flash drive, and a power source, in the form of a rechargeable battery 36. The control unit preferably also comprises a visual display unit or screen, via which pertinent information can be provided to the operator, such as any, or any combination of, battery life, inclination readings, position information and/or field strength readings.

During use, the operator walks along the path of a, typically buried, pipeline in the Y direction with the sensors 16 oriented and spaced in the X direction as shown. The known, fixed spacing of the sensors 16 is important to note, as will be discussed below.

The parameters recorded by the control unit comprise any, or any combination of: the X, Y and Z data from each magnetometer (identified in the further figures as parameters X1, Y1, Z1, X2, Y2, Z2, X3, Y3 and Z3); GNSS Date, Time, Longitude, Latitude, Altitude; Satellite Positioning Fix Mode; Number of satellites used for positional computation; Horizontal dilution of precision (HDOP); RMS latitude error [meters]; RMS longitude error [meters]; RMS altitude error [meters]; and Inclination about X, Y and Z axes.

Recording the RMS error of each measurement provides confidence in the absolute position of each magnetic field measurement, which data is not available from single receiver GNSS systems. As the data is saved to the USB Flash device, error checking information is appended to each data record so that any data corruption can be detected at a later time and the corrupted data record can be subsequently removed.

Additionally, the main processor outputs positional and status information to the control unit display. In embodiments which include an inclinometer system, the instantaneous angle of the sensors is determined, which may also be time stamped and recorded in the manner described above.

Figure 5:
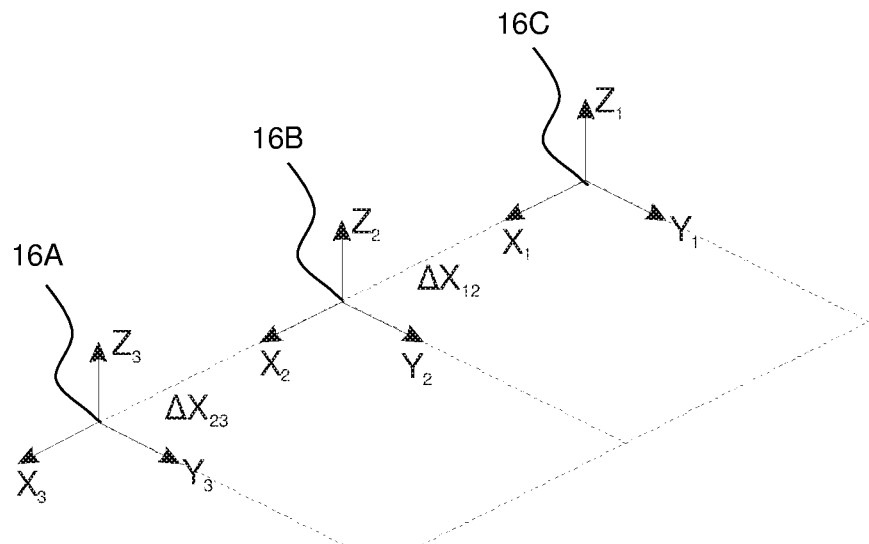
FIG. 5 shows a sensor array according to one example of the invention.
Figure 6:
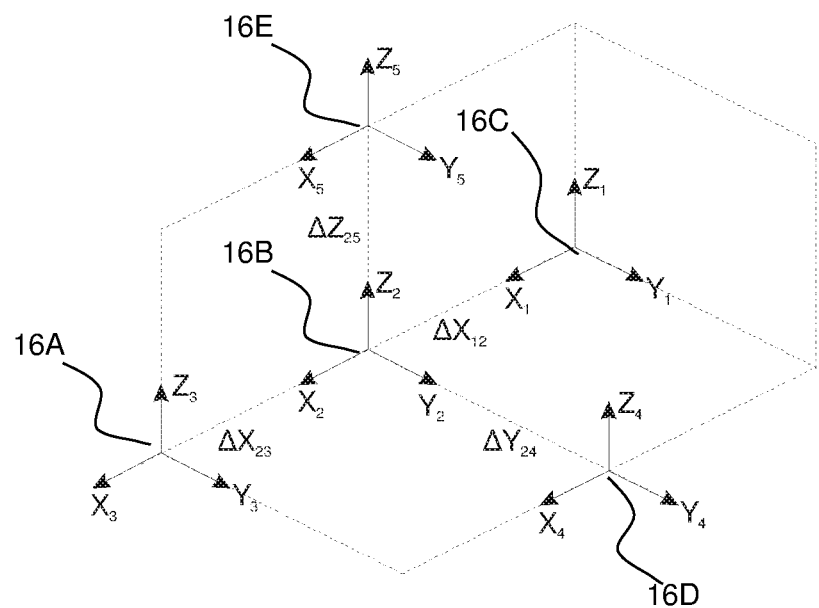
FIG. 6 shows a sensor array according to another example of the invention.

Turning to FIGS. 5 and 6, there are shown examples of sensor arrays that may be used. The present invention may be implemented with only two magnetic field sensors, whereas the examples below allow depth detection to be implemented in a more complex system, for example which can also be used for other pipeline survey functionality. In the embodiment of FIG. 5, three sensors 16A, 16B and 16C are provided in a linear array. The sensors 16A, B and C are aligned with respect to the X axis, such that the Y and Z axes are perpendicular to the linear array of sensors. Each of the sensors is spaced from the adjacent sensor by an equal, fixed distance.

This arrangement of sensors is used to determine the rate of change of the magnetic field in the X direction, which typically represents a lateral direction across the pipeline, when the Y axis is the direction of travel along the pipeline.

A further sensor array in FIG. 6, in which a further sensor 16D is provided, which is spaced by the same distance from one of the sensors 16A, B or C. Ideally the sensor 16D is adjacent the middle sensor 16B. However, unlike the linear array of FIG. 5, the further sensor 16D is spaced from the other sensors in the Y direction. Thus the combined sensors 16A-D now define a two-dimensional, or planar, array extending in the XY plane.

In another embodiment, further sensor 16E is provided, which is spaced by the same distance from one of the sensors 16A, B or C in the Z (typically substantially vertical) direction. Thus the combined sensors 16A-C and E now define a two-dimensional, or planar, array extending in the XZ plane. The known, fixed distance between the sensors 16E and 16B allows corresponding magnetic field gradients (i.e. for all three axes) to be determined in the Z direction.

As shown in FIG. 5, further sensors 16D (in the Y direction) and 16E (in the Z direction) are provided so as to provide a three-dimensional array, in which each sensor is spaced from an adjacent sensor by an equal distance in either of the X, Y or Z axes. Any such an arrangement could be supplemented with further sensors in the negative Y and Z directions, in addition to, or instead of, 16D and/or 16E. Whilst the above embodiments can provide up to three sensors aligned in each axis/direction, it is to be noted that further sensors could be provided in any or all of those directions to improve the accuracy of gradient determination and/or identify any spurious sensor readings.

Whilst the above described equipment could be used for any of the purposes described in prior patent applications WO 2013/128212 and WO 2013/128210, the following description proceeds in relation to pipeline location detection.

In use, apparatus of the kind described above was positioned above a submerged pipeline and moved in the direction of the pipeline longitudinal axis so as to follow the pipeline, whilst recording magnetic field readings and monitoring the location of the apparatus 10.

Figure 7:
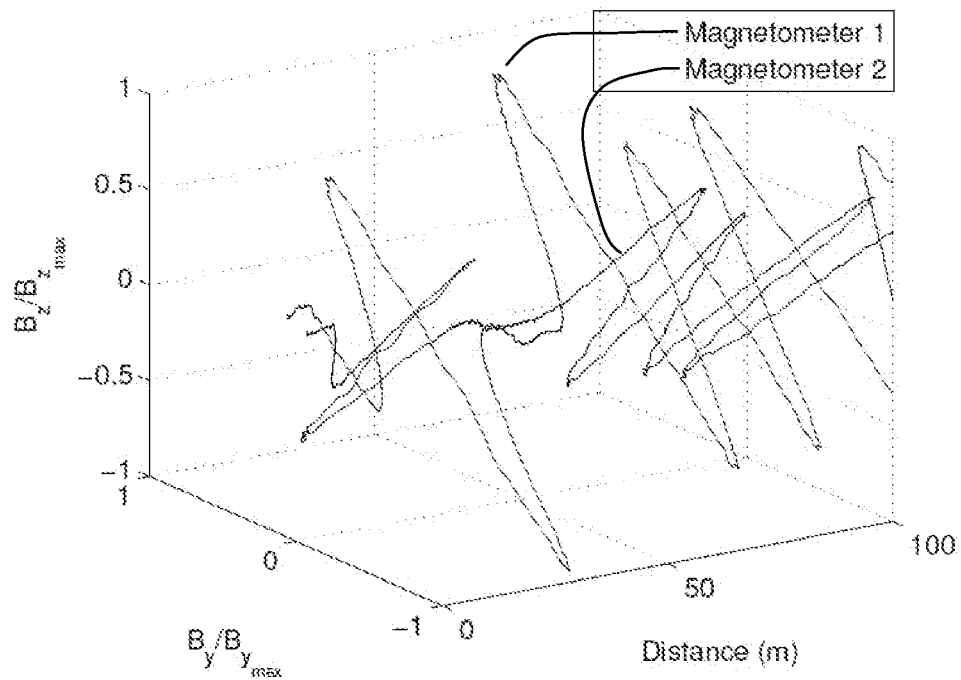
FIG. 7 shows variation in magnetic field along a section of pipe measured by two magnetic field sensors.

FIG. 7 is an example of field trial results showing variation of magnetic field recorded by two magnetometers over 100 metres of pipeline length. The vector of the magnetic field recorded by the sensors I this example is directed to the centre, i.e. the longitudinal axis, of the pipe.

Figure 8:
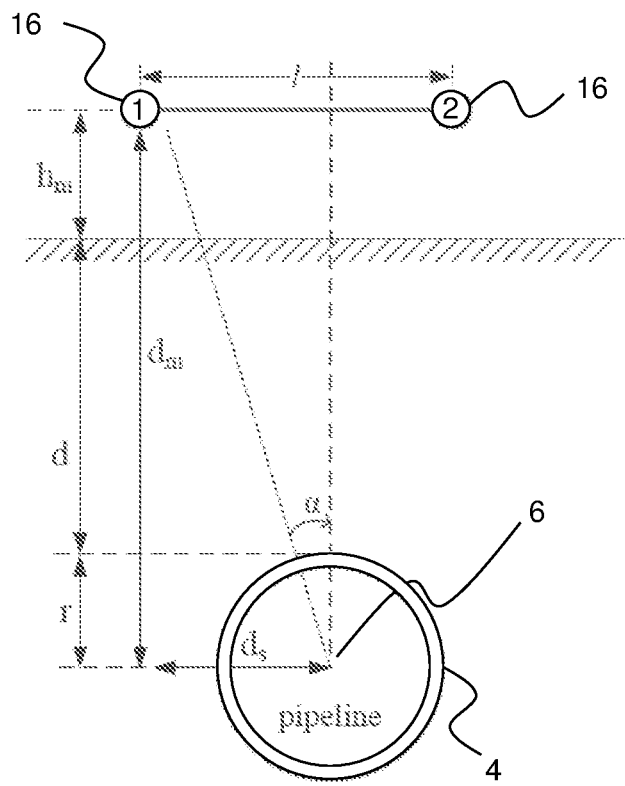
FIG. 8 shows the dimensions used to determine pipeline depth in accordance with an example of the invention.

In FIG. 8, there is shown a schematic section view through the pipeline under inspection, where a pair of magnetic field sensors 16 are spaced by a fixed distance, l. Consider the pipeline 4 being placed in the Earth's field, and the sensors 16 being spaced apart in a horizontal plane xy above the pipeline axis 6 at a distance $d_m$ in a vertical direction. The sensors are located either side of the axis 6, i.e. either side of a vertical plane yz containing the axis 6. The sensors 16 are moved in unison with a lateral offset, $d_s$, from the longitudinal axis. Successive sensor readings are taken and, for each set of readings, the angle, α, subtended between one sensor 16 and the vertical plane yz containing the axis 6, can be calculated as:

$$\tan(\alpha) = \frac{d_s}{d_m}.$$

The magnetic field $B_{xz}$ of the pipeline induced from the Earth's magnetic field measured by the magnetometer 16 when observed along the pipe length will also be at the angle α, Therefore, $$\tan(\alpha) = \frac{B_y}{B_z}$$

In case of above-ground surveys on buried pipelines, $d_s$, is usually unknown, so in order to determine the distance $d_m$, an additional measurement at a different lateral offset can be performed along the pipeline for the other sensor 16 shown in FIG. 8. Thus the known, fixed separation, l, between the two sensors 16 can be used.

Given $d_s$ is the lateral offset between one magnetometer and the centreline of the pipe, because the distance between the measurements is l, the equation $$d_s1 + d_s2 = l$$

applies to all sets of measurements for the two sensors, and the depth $d_m$ can be calculated as:

$$d_m = l / \left( \frac{B_{y_1}}{B_{z_1}} + \frac{B_{y_2}}{B_{z_2}} \right)$$

The lateral position of the measurement in relative to the pipeline centreline, which is the offset between the magnetometer and the centreline, is:

$$d_s = \frac{B_y}{B_z} d_m$$

If the pipe radius r and the height of the magnetometer array above ground $h_m$ are known, the depth of cover, d, from the top of the pipeline, e.g. top dead centre, can then be calculated as follows:

$$d = d_m - h_m - r$$

Thus for any known position of the apparatus 10 recorded by the position determining system 18, the buried depth of the pipeline and the lateral offset of the pipeline relative to the sensors 16 can be calculated using the above method. By repeating the above methodology at multiple points along the pipeline path, an accurate three-dimensional map or layout of the pipeline can be constructed. This is particularly beneficial for either pipeline location alone, or else when used to feed into other pipeline survey calculations for stress concentrations or the like.

Figure 9:
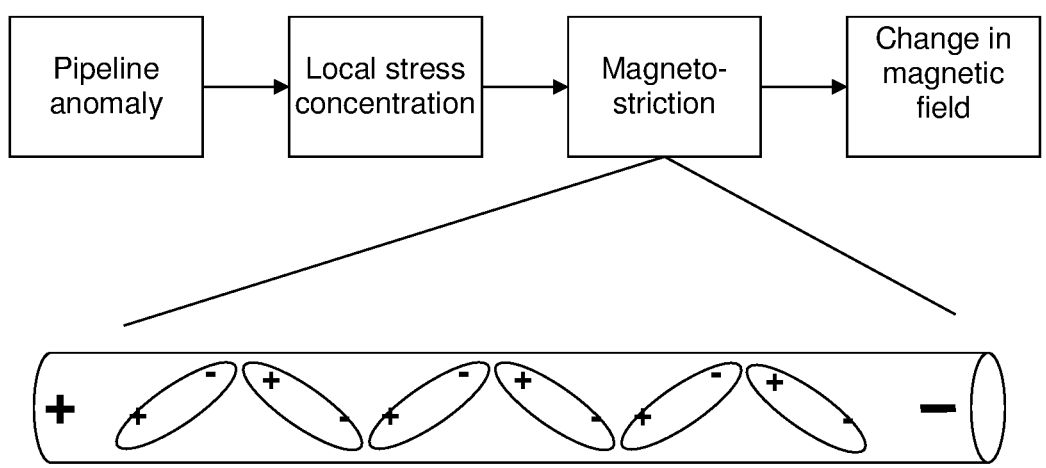
FIG. 9 shows a schematic flow diagram of the occurrence of change in the magnetic field surrounding an elongate structure.

In FIG. 9, there is shown the basic principle by which a change in internal stress within a pipeline causes a change in the sensed magnetic field in the vicinity of the stress concentration. The magnetic field sensors provide an output for the total magnetic field which comprises a component representing the Earth's magnetic field and an additional, variable component corresponding to the variations in the pipeline under inspection. For a reading of the Earth's magnetic field typically in the region of 30 to 60 µT, the additional component due to the pipeline can be expected to have a magnitude in the region of a few, such as, for example between 0-5 or 10, µT.

Figure 10:
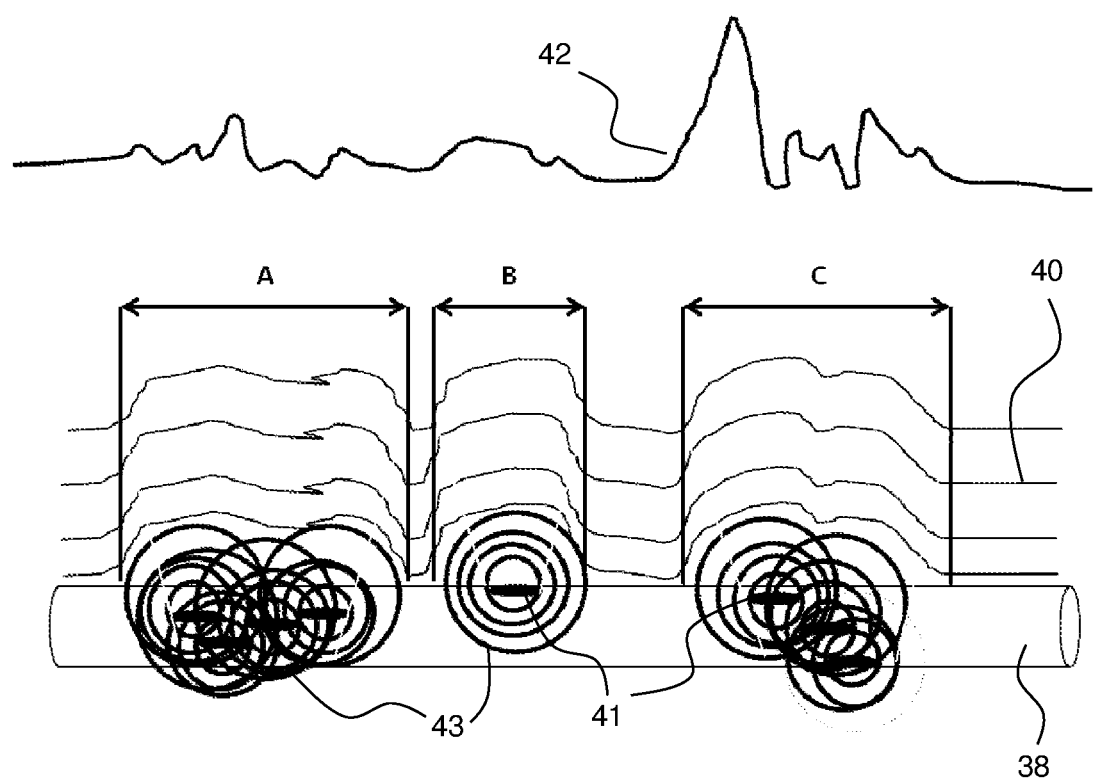
FIG. 10 shows a schematic of an example of magnetic field readings taken according to a survey system including depth detection according to an example of the present invention.

The magnetic field measurements and/or gradient values can be plotted along the length of the pipeline. FIG. 10 shows schematically the changes or disturbances in the magnetic field 40 that are produced by individual, or a plurality of, anomalies A, B and C in the pipeline structure. As described above, those anomalies correspond to regions of stress in the pipeline structure, whereby the magnetic flux leakage emanating from a stress concentration zone under applied conditions of stress can be modelled in accordance with the theory of magnetostriction. The plot 42 of magnetic field variations thus shows changes in magnetic field which correspond to the location of the anomalies 41. Thus the degree of stress experienced by the pipeline is deduced from the characteristics of the magnetic field along/across the pipeline structure.

As can be seen in FIG. 10, the magnetic field spreads or dissipates with distance from the anomaly 41. This dissipation of the magnetic field disturbances occurs in three dimensions, i.e. over the surface of a sphere having a radius equal to the distance from the anomaly, which is represented as a series of concentric circles 43 in FIG. 6. Thus a correction factor can be applied to the disturbances recorded in the magnetic field at a distance from the anomaly in order to more closely identify the anomaly. A correction factor may be estimated or accurately determined based on a known or estimated depth of the pipeline and/or the magnetic permeability of the medium between the pipe and the sensors. The output of the depth measurement of the present invention can feed directly into a determination of stress concentrations for the pipeline and thus the structural integrity or health of the pipeline.

Aspects of the present invention may be attributed to a triangulation method of pipeline position assessment based on magnetic field readings in accordance with the above description. Unlike analysis of stress concentrations, in the pipe, depth/location determination may use raw/actual magnetic field readings as an input, rather than gradients therein or other derived features. For example the depth determination may use the raw magnetic field reading/strength in the z, or vertical, direction.

It will be noted that the presence of stress concentrations in the structure being surveyed may affect the magnetic field readings and thus the depth determination. However since the vector field strength readings rely on both magnitude and direction, the impact of the stress concentrations can be accommodated. Furthermore, sections of a pipeline are elongate in form and any stress concentrations are typically highly localised, such that a suitable algorithm can compensate for the local changes in the magnetic field due to stress concentration. Accordingly depth determinations over a section as a whole are valid. Pipe sections analysed using the invention may have a length dimension of greater than 2 or 3 metres, such as for example in the region of 3-12 metres in length. However it is feasible that other lengths of pipe could be considered.

Whilst FIGS. 1 and 9 show a simplified view of how a model for a pipeline can be constructed based on magnetic field readings, in reality there are numerous pipeline features that can hamper the generation of accurate and meaningful results. For example, joints/welds between pipeline sections can differ and can impact the results significantly. Other pipeline features, located intermediate adjacent pipe sections, such as valves, access points and/or sensing equipment can be identified by comparison with other data sources or plans for the pipeline where available. Such data sources may include for example conventional in-line inspection (ILI) data. However in many instances, particularly where accurate additional data sources for the location of such features are not available, it can be problematic to correctly identify and assess such features such that any detriment to overall accuracy of the results can be mitigated.

In this regard, it has been found by the inventors that considering the pipeline sections in principle as large bar magnets created by the Earth's magnetic field can lead to the derivation of further useful data for assessing pipeline location. In particular, between the opposing ends/poles of a section of pipe, e.g. substantially half way along a pipe section, a corresponding feature in the field readings can be detected. The specific feature may comprise a zero-crossing in the magnetic field or a minimal gradient. The feature may otherwise be described as a change in polarity and/or a point at which the magnitude in the disturbance in the Earth's magnetic field (absent any defects in the pipe section) caused by the presence of the specific pipe section is a minimum along its length.

In one example, the midpoint may be detected by analysis of the raw magnetic field readings in the Z direction.

Similarly, the end point of a pipeline section can be identified as maximum magnitude in field strength for the section, absent any stress concentration or defect in the pipeline itself.

Either or both feature in the magnetic field readings can provide a further key point for assessment of a pipeline section. That is to say the detection of the midpoint of a pipeline section can be automated by identification of one or more associated criteria or data feature within the magnetic field readings.

This is important since the system can therefore identify not only each end of a pipeline section, e.g. due to the magnetic field disturbance caused by an interface with an adjacent pipeline section or an intermediate feature/component, but also the midpoint of the pipeline section. Therefore, as the apparatus passes over the end of one pipeline section, towards the next, it is possible to pre-empt where the mid-point and/or opposing end should occur and thus to pre-empt the associated impact on the magnetic field readings.

This allows certain field readings to be discarded in above-described pipeline location determination steps or else modified to discount typical magnetic field changes for a typical pipeline section that would serve to adversely affect depth/position results. Thus according to aspects of the invention there may be provided apparatus and/or an associated method of pipeline inspection that involves detecting a midpoint of a pipeline section and performing any or any combination of: determining or validating a periodicity of magnetic field features associated with a mid-point or end point of pipeline sections; determining the location of an end point of a pipeline section or a mid-point of an adjacent section, e.g. independently of field readings taken at said point(s); discarding magnetic field data associated with a mid or end point of a pipe for depth/location determination; and/or modifying sensed magnetic field data readings in an automated depth detection or pipeline survey process.

This positive identification of the pipeline midpoint and/or ends can also feed into the pipeline structural survey using magnetic field readings since it can be used to help remove readings associated with a normal pipeline mid-point or end-point as opposed to those associated with an actual stress concentration. For example, this may assist in being able to identify automatically a difference between a normal joint and a stressed or defective joint.

It will be appreciated based on the above discussion that the ability to verify the occurrence of magnetic field readings associated with mid or end points of a pipeline section can be of particular benefit in improving the confidence and/or accuracy of pipeline location and survey results generated.

The invention claimed is:

1. A method of determining the position of an elongate structure comprising:

providing a plurality of magnetic field sensors arranged at fixed spacing, each sensor being arranged to sense a magnetic field of a remote structure induced by the Earth's magnetic field in at least two orthogonal directions;

arranging the magnetic field sensors remotely of an elongate structure having a longitudinal axis, such that the magnetic field sensors are spaced in a lateral direction relative to said longitudinal axis;

determining an angular spacing for the magnetic field sensors about the longitudinal axis according to the magnetic field readings in the two orthogonal directions; and determining a distance between one or more of said magnetic field sensors and said elongate structure based on said angular spacing determination; and identifying one or more feature, or feature type, in the magnetic field readings occurring at a regular, repeating spacing along the length of the elongate structure and discounting or modifying the magnetic field readings at locations along the elongate structure according to said regular spacing.

2. The method of claim 1, wherein the distance determination is made according to concurrent magnetic field readings sensed by the plurality of magnetic field sensors.

3. The method of claim 2, wherein the concurrent magnetic field readings comprise vector readings and the angular spacing for each magnetic field sensor is determined according to a direction component of the vector readings.

4. The method of claim 2, wherein the angular spacing is determined according to a ratio of magnetic field reading components in the at least two orthogonal directions.

5. The method of claim 1, wherein the magnetic field sensors are held at a fixed, predetermined spacing and said angular spacing for the magnetic field sensors is processed in conjunction with predetermined sensor spacing in order to determine the distance between the one or more sensor and the elongate structure according to a trigonometric relationship.

6. The method of claim 1, wherein each sensor takes passive magnetic field strength readings.

7. The method of claim 1, wherein the determined distance is in a direction substantially orthogonal to the lateral direction in which the magnetic field sensors are spaced.

8. The method of claim 1, comprising determining the lateral offset between one or more of the magnetic field sensors and the longitudinal axis of the elongate structure.

9. The method of claim 1, wherein the elongate structure is a buried or submerged structure and the determined distance comprises a depth to which the structure is buried or submerged.

10. The method of claim 1, wherein thee angular spacing comprises an angular spacing from vertical about the longitudinal axis.

11. The method of claim 1, further comprising:

moving the plurality of sensors in a direction substantially aligned with the longitudinal axis and taking a plurality of magnetic field readings using the magnetic field sensors at locations spaced in said direction; and determining the distance between one or more of said magnetic field sensors and the elongate structure at each of said locations.

12. The method of claim 11, wherein the elongate structure comprises a plurality of adjoining sections, the method further comprising searching for features in the magnetic field readings comprising any of a peak, trough or zero-crossing and identifying a location of an end and/or midpoint of a section of the elongate structure according to the location of the feature in the magnetic field readings.

13. The method of claim 12, comprising discarding the field reading in the distance determination at said location and/or identifying the length or periodicity for the each of the plurality of sections.

14. The method of claim 1, comprising processing the magnetic field readings from the sensors in dependence on the determined distance so as to determine a level of stress within the elongate structure.

15. The method of claim 1, comprising using a position determining system to record the position of one or more of the magnetic field sensors and determining the relative position of the remote elongate structure according to the distance determination.

16. The method of claim 15, comprising outputting a three-dimensional plan for the elongate structure according to the position of the one or more magnetic field sensors offset by the determined distance to the elongate structure.

17. Apparatus for remote determination of the position of an elongate structure, the apparatus comprising:
   a sensor array comprising two or more magnetic field sensors arranged to be moved relative to the structure in known direction each sensor being arranged to sense a magnetic field of a remote structure induced by the Earth's magnetic field in at least two orthogonal directions;
   a support for holding the magnetic field sensors at a spacing in a lateral direction relative to a longitudinal axis of the elongate structure;
   a controller for recording magnetic field readings taken by the magnetic field sensors in said two orthogonal directions at different locations in the direction of movement thereof; and
   one or more processor for processing the plurality of magnetic field readings so as to determine an angular spacing of each magnetic field sensor about the longitudinal axis according to the magnetic field readings, and determine a distance between one or more of said magnetic field sensors and said elongate structure based on said angular spacing determination, identify one or more features, or feature types, in the magnetic field readings occurring at a regular, repeating spacing along the length of the elongate structure and discount or modify the magnetic field readings at locations along the elongate structure according to said regular spacing.

18. A data carrier comprising machine readable instructions for the control of one or more processors in a remote structure assessment system to:
   receive vector magnetic field readings from a plurality of magnetic field sensors held at a known spacing therebetween and at a distance from an elongate structure under assessment, the magnetic field readings comprising a magnetic field of the remote structure induced by the Earth's magnetic field;
   determine a direction from each magnetic field sensor to the remote structure according to the vector magnetic field readings;
   determine the distance between one or more of said magnetic field sensors and said elongate structure based on said direction determination and the known spacing between the magnetic field sensors;
   identify one or more feature, or feature type, in the magnetic field readings occurring at a regular, repeating spacing along the length of the elongate structure; and
   discount or modify the magnetic field readings at locations along the elongate structure according to said regular spacing.

* * * * *